(12) United States Patent
Matsumura et al.

(10) Patent No.: US 11,081,689 B2
(45) Date of Patent: Aug. 3, 2021

(54) POSITIVE ELECTRODE FOR ELECTROCHEMICAL DEVICE, AND ELECTROCHEMICAL DEVICE PROVIDED THEREWITH

(71) Applicant: Panasonic Intellectual Property Management Co., Ltd., Osaka (JP)

(72) Inventors: Nao Matsumura, Osaka (JP); Masatoshi Takeshita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/491,183

(22) PCT Filed: Mar. 30, 2018

(86) PCT No.: PCT/JP2018/013556
§ 371 (c)(1),
(2) Date: Sep. 5, 2019

(87) PCT Pub. No.: WO2018/181874
PCT Pub. Date: Apr. 10, 2018

(65) Prior Publication Data
US 2020/0035994 A1 Jan. 30, 2020

(30) Foreign Application Priority Data
Mar. 31, 2017 (JP) .............................. JP2017-072861

(51) Int. Cl.
*H01M 4/137* (2010.01)
*H01G 11/28* (2013.01)
(Continued)

(52) U.S. Cl.
CPC ............ *H01M 4/137* (2013.01); *H01G 11/28* (2013.01); *H01G 11/48* (2013.01); *H01M 4/606* (2013.01); *H01M 2004/028* (2013.01)

(58) Field of Classification Search
CPC ................. H01M 4/137; H01M 4/606; H01M 2004/028; H01G 11/28; H01G 11/48; H01G 11/70; H01G 11/06
See application file for complete search history.

(56) References Cited

U.S. PATENT DOCUMENTS

| | | |
|---|---|---|
| 2014/0220438 A1 | 8/2014 | Abe et al. |
| 2015/0303475 A1 | 10/2015 | Abe et al. |
| 2017/0317345 A1 | 11/2017 | Abe et al. |

FOREIGN PATENT DOCUMENTS

| | | |
|---|---|---|
| JP | 1-194266 | 8/1989 |
| JP | 11-040143 | 2/1999 |

(Continued)

OTHER PUBLICATIONS

International Search Report of PCT application No. PCT/JP2018/013556 dated Jun. 19, 2018.

*Primary Examiner* — Wyatt P McConnell
(74) *Attorney, Agent, or Firm* — McDermott Will and Emery LLP

(57) ABSTRACT

An electrochemical device includes a positive electrode and a negative electrode. The positive electrode for the electrochemical device includes a positive current collector, and an active layer including a conductive polymer disposed on the positive current collector. The conductive polymer contains a polyaniline or a derivative of polyaniline. An infrared absorption spectrum of the active layer exhibits a peak derived from a carbonyl group. The peak derived from the carbonyl group appears, for example, in a range from 1600 $cm^{-1}$ to 1700 $cm^{-1}$, inclusive.

5 Claims, 4 Drawing Sheets

(51) Int. Cl.
*H01G 11/48* (2013.01)
*H01M 4/60* (2006.01)
*H01M 4/02* (2006.01)

(56) References Cited

FOREIGN PATENT DOCUMENTS

| | | | |
|---|---|---|---|
| JP | 11040143 A | * | 2/1999 |
| JP | 2013-232388 | | 11/2013 |
| JP | 2014-035836 | | 2/2014 |
| JP | 2014-139927 | | 7/2014 |

* cited by examiner

POSITIVE ELECTRODE FOR ELECTROCHEMICAL DEVICE, AND ELECTROCHEMICAL DEVICE PROVIDED THEREWITH

CROSS-REFERENCE TO RELATED APPLICATIONS

This application is a U.S. national stage application of the PCT International Application No. PCT/JP2018/013556 filed on Mar. 30, 2018, which claims the benefit of foreign priority of Japanese patent application 2017-072861 filed on Mar. 31, 2017, the contents all of which are incorporated herein by reference.

TECHNICAL FIELD

The present invention relates to a positive electrode for an electrochemical device, which includes an active layer including a conductive polymer, and an electrochemical device including the positive electrode.

BACKGROUND

In recent years, attention has been paid to an electrochemical device having performances intermediate between a lithium ion secondary battery and an electric double layer capacitor. Investigations have been made, for example, about use of a conductive polymer as a positive electrode material (see Unexamined Japanese Patent Publication No. 2014-35836). Since electrochemical devices including, as a positive electrode material, a conductive polymer are charged and discharged by adsorption of anions (doping) and desorption of the anions (dedoping), these devices are small in reaction resistance. Thus, the electrochemical devices exhibit a higher output power than general lithium ion secondary batteries.

SUMMARY

In a case where polyanilines including polyaniline or a derivative of the polyaniline is used as the conductive polymer, the float property is likely to be declined in float charging that a constant voltage is continuously applied to the electrochemical device.

An aspect of the present invention relates to a positive electrode for an electrochemical device. The positive electrode includes a positive current collector, and an active layer including a conductive polymer disposed on the positive current collector. The conductive polymer contains a polyaniline or a derivative of polyaniline. An infrared absorption spectrum (hereinafter, referred to as an IR spectrum) of the active layer exhibits a peak derived from a carbonyl group.

Another aspect of the present invention relates to an electrochemical device. The electrochemical device includes the positive electrode described above, and a negative electrode.

According to the present invention, a decline in float property for an electrochemical device can be suppressed.

DESCRIPTION OF EMBODIMENT

In an electrochemical devices, the use of a conductive polymer as a positive electrode material has been considered. During charging, anions in the electrolytic solution are doped into the conductive polymer, and lithium ions in the electrolytic solution are occluded in a negative electrode material. During discharging, anions dedoped from the conductive polymer move into the electrolytic solution, and lithium ions released from the negative electrode material move into the electrolytic solution. It is to be noted that the present invention includes cases where the conductive polymer exhibits almost no electric conductivity or does not exhibit electric conductivity in a state where anions have been dedoped from the conductive polymer.

In the case of using, as the conductive polymer, polyanilines such as polyaniline and a derivative of polyaniline, when a constant voltage is continuously applied to the electrochemical device by float charging, the capacity of the positive electrode is likely to be decreased.

In a positive electrode for an electrochemical device according to one exemplary embodiment of the present invention, in an active layer including a conductive polymer, the conductive polymer contains polyaniline or a derivative of polyaniline. And an IR spectrum of the active layer exhibits a peak derived from a carbonyl group ($>$C$=$O). By providing such an active layer, the state of the conductive polymer which contributes to charging/discharging can be maintained. Thus, the increase in internal resistance during float charging can be suppressed. In addition, decrease in capacity during float charging can be suppressed. Thus decline in float property for the electrochemical device can be suppressed.

The IR spectrum mentioned above may be measured for the active layer at the surface of a sample obtained by adequately washing and drying the positive electrode.

<<Electrochemical Device>>

The electrochemical device according to the present exemplary embodiment includes a positive electrode and a negative electrode. The positive electrode includes a positive current collector and an active layer disposed on the positive current collector. A carbon layer may be disposed on the positive current collector. When a carbon layer is provided, a resistance between the positive current collector and the active layer can be reduced to suppress decrease in capacity. Thus it is advantageous for restraining decline in float property. The active layer may be disposed on the positive current collector, for example, with a carbon layer disposed between the positive current collector and the active layer, or disposed directly on the positive current collector in a case where there is a region with no carbon layer present.

Figure 1:
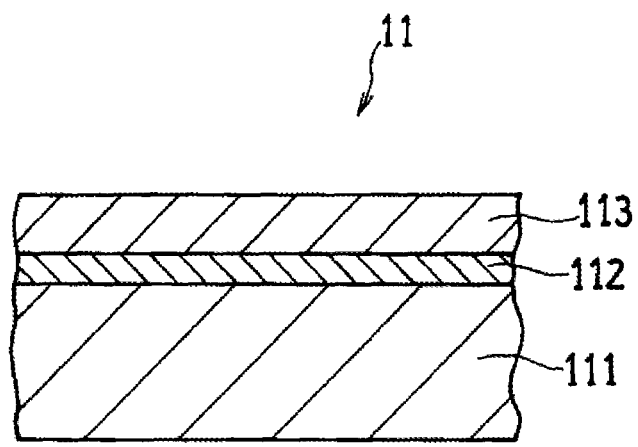
FIG. 1 is a schematic sectional view illustrating a positive electrode for an electrochemical device according to one exemplary embodiment of the present invention.

FIG. 1 shows a schematic cross-sectional view illustrating a positive electrode in the case of including a carbon layer. Positive electrode 11 illustrated as an example includes positive current collector 111, carbon layer 112 disposed on positive current collector 111, and active layer 113 disposed on positive current collector 111 via carbon layer 112 interposed between positive current collector 111 and active layer 113. Active layer 113 includes a conductive polymer containing a polyaniline or a derivative of polyaniline. An IR spectrum of active layer 113 exhibits a peak derived from a carbonyl group.

Figure 2:
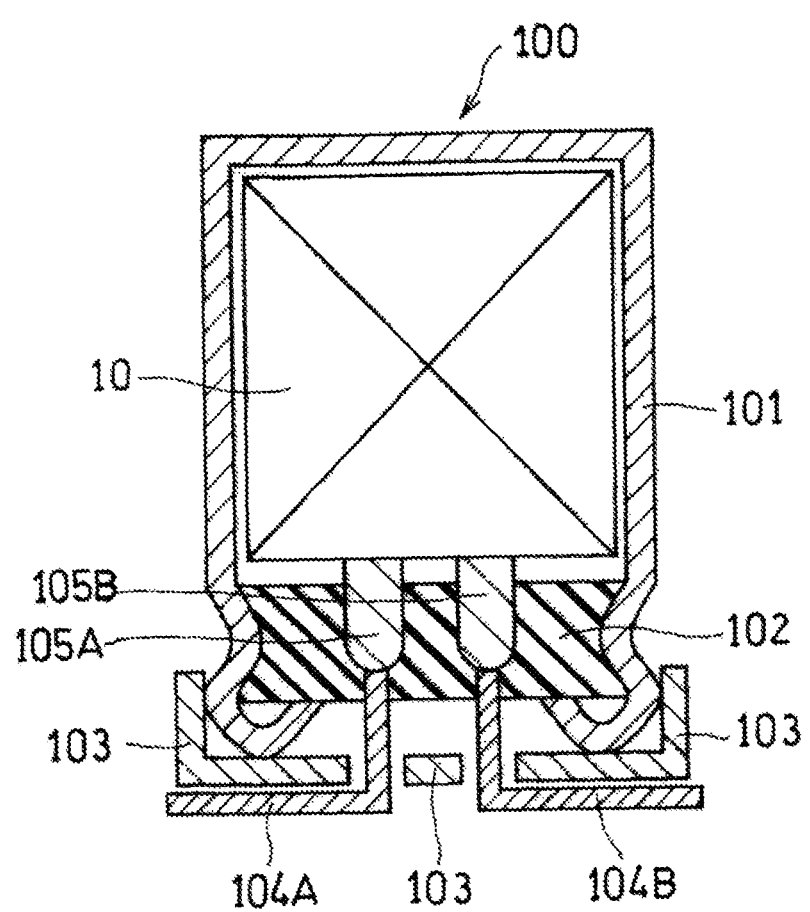
FIG. 2 is a schematic sectional view illustrating an electrochemical device according to one exemplary embodiment of the present invention.
Figure 3:
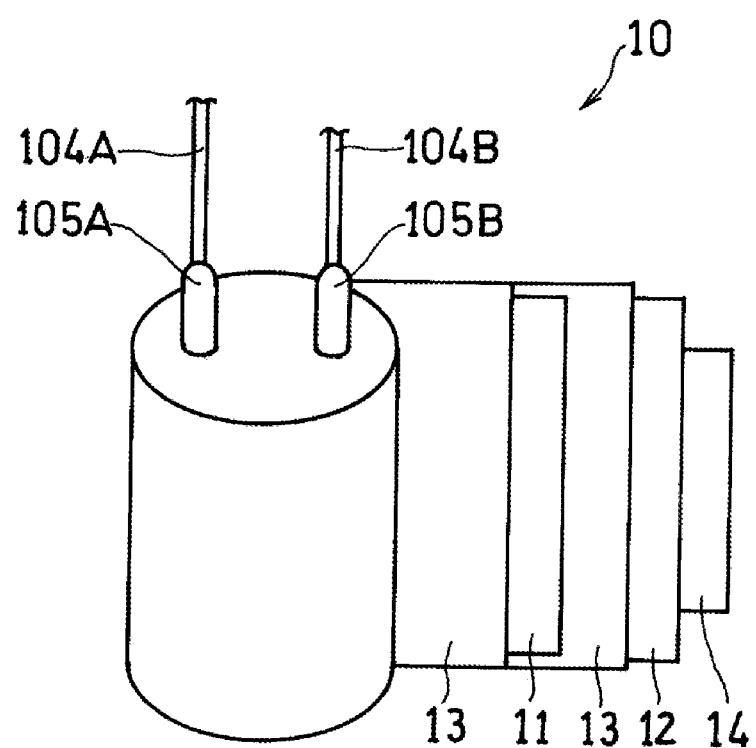
FIG. 3 is a schematic view for illustrating a structure of an electrode group of the electrochemical device in FIG. 2.

Hereinafter, a configuration of an electrochemical device according to the present invention will be described in more detail with reference to the drawings. FIG. 2 is a schematic sectional view illustrating electrochemical device 100 according to the present exemplary embodiment. FIG. 3 is a schematic developed view illustrating part of electrode group 10 included in electrochemical device 100.

Electrochemical device 100 includes electrode group 10, container 101 which houses electrode group 10, sealing body 102 for sealing an opening of container 101, and base plate 103 covering sealing body 102. Electrochemical device 100 further includes lead wires 104A and 104B which each lead out from sealing body 102 to penetrate base plate 103, and lead tabs 105A and 105B which connect lead wires 104A and 104B to the respective electrodes of electrode group 10. Container 101 is, at its part near an end of the opening, processed inward by drawing. The opening end of container 101 is curled to swage sealing body 102. Electrode group 10 includes positive electrode 11 and a negative electrode. Typically, a separator is disposed between positive electrode 11 and the negative electrode.

(Positive Electrode)

The present invention encompasses a positive electrode of an electrochemical device (positive electrode for electrochemical device). Hereinafter, the positive electrode will be described in more detail.

(Positive Current Collector)

As positive current collector 111 of positive electrode 11, for example, a sheet-form metallic material is used. The sheet-form metallic material is, for example, a metal foil piece, a metal porous body, a punched metal, an expanded metal or an etched metal. As a material for positive current collector 111, for example, aluminum, an aluminum alloy, nickel, titanium and the like can be used. The material is preferably aluminum or an aluminum alloy. Positive current collector 111 has a thickness ranging, for example, from 10 μm to 100 μm, inclusive.

(Carbon Layer)

Carbon layer 112 is formed, for example, by vapor-depositing a conductive carbon material onto a surface of positive current collector 111. Alternatively, carbon layer 112 is formed by applying a carbon paste containing a conductive carbon material onto a surface of positive current collector 111 to form a coating film, and then drying the coating film. The carbon paste contains, for example, the conductive carbon material, a polymer material, and water and/or an organic solvent. Carbon layer 112 may have a thickness ranging, for example, from 1 μm to 20 μm, inclusive.

As the conductive carbon material, graphite, hard carbon, soft carbon, carbon black and the like can be sued. Among these conductive carbon materials, carbon black is preferable because this material easily forms carbon layer 112 that is thin and excellent in electric conductivity. Average diameter D1 of the conductive carbon material is not particularly limited, and ranges, for example, from 3 nm to 500 nm, inclusive, and preferably from 10 nm to 100 nm, inclusive. The average particle diameter is a median diameter (D50) in a volume particle size distribution that is obtained by a laser diffraction particle size distribution measuring apparatus (the same shall apply hereinafter). Average diameter D1 of carbon black may be calculated by an observation through a scanning electron microscope.

The polymer material is not particularly limited, and is preferably, for example, fluororesin, acrylic resin, polyvinyl chloride, polyolefin resin, styrene-butadiene rubber (SBR), or water glass (polymer of sodium silicate) because such a material is electrochemically stable and is excellent in acid resistance.

(Active Layer)

Active layer 113 includes a conductive polymer. In the preparation of active layer 113, a conductive polymer layer is formed first. The conductive polymer layer can be formed, for example, by immersing positive current collector 111 including carbon layer 112 in a reaction liquid containing a raw material for the conductive polymer, and subjecting the raw material to electrolytic polymerization in the presence of positive current collector 111. In the formation of the conductive polymer layer, positive current collector 111 is used as an anode to conduct the electrolytic polymerization. In this way, the conductive polymer layer is formed to cover a surface of carbon layer 112. It is to be noted that in the case of forming no carbon layer 112, positive current collector 111 is immersed in a reaction liquid to conduct the electrolytic polymerization. In this way, the conductive polymer layer is formed to cover the surface of positive current collector 111. Alternatively, the conductive polymer layer may be formed after forming an interposed layer other than the carbon layer.

The conductive polymer layer may be formed by a method other than the electrolytic polymerization. The conductive polymer layer may be formed, for example, by chemical polymerization of the raw material. Alternatively, the conductive polymer layer may be formed by using the conductive polymer, or a dispersion of the conductive polymer.

According to the present exemplary embodiment, since active layer 113 includes the conductive polymer containing a polyaniline or a derivative of polyaniline, the raw material used in the electrolytic polymerization or the chemical polymerization may be thus a polymerizable compound capable of being polymerized to produce a conductive polymer. Examples of the raw material include a monomer and/or an oligomer. Examples of the raw material monomer include anilines such as aniline or a derivative of aniline. The derivative of aniline means a monomer that has a basic skeleton of aniline. Examples of the raw material oligomer include oligomers of the anilines. These raw materials may be used alone or in combination of two or more raw materials.

Polyanilines are used as the conductive polymer. For example, polyaniline or a derivative of the polyaniline can be used as the polyanilines. It is to be noted that the derivative of polyaniline means a monomer that has a basic skeleton of polyaniline. The polyanilines are preferably a α-conjugated polymers. The polyanilines may be used alone, or can be used in combination of two or more polyanilines.

Weight-average molecular weights of the polyanilines are not particularly limited, and ranges, for example, from 1000 to 100000, inclusive.

The conductive polymer constituting the active layer may contain, besides the polyanilines (also referred to as a first conductive polymer), a conductive polymer (also referred to as a second conductive polymer). However, a ratio of the second conductive polymer is preferably small. A ratio of the first conductive polymer to entirety of conductive polymer constituting the active layer is more than or equal to 90% by mass, preferably more than or equal to 95%. Further, the conductive polymer is preferably constituted by only the polyanilines. As the second conductive polymer, π-conjugated polymers other than the polyanilines can be used, such as, for example, polypyrrole, polythiophene, polyfuran, polythiophene vinylene, polypyridine, or a derivative of any one of these polymers. It is to be noted that derivatives of the π-conjugated polymers mean polymers that have a basic skeleton of a π-conjugated polymer.

The electrolytic polymerization or the chemical polymerization is preferably performed by use of a reaction liquid containing an anion (dopant). Preferably, the dispersion or solution of the conductive polymer also contains a dopant. The polyanilines and other π-electron conjugated polymers exhibit excellent electric conductivity by doping the polymers with a dopant. For example, in the chemical polymerization, positive current collector 111 may be immersed in a reaction liquid containing a dopant, an oxidizing agent and a raw material monomer. Subsequently, positive current collector 111 is picked out from the reaction liquid, and dried. In the electrolytic polymerization, positive current collector 111 and a counter electrode may be immersed in a reaction liquid containing a dopant and a raw material monomer. By using positive current collector 111 and the counter electrode as an anode and a cathode, respectively, an electric current is flowed between the two electrodes.

As a solvent in the reaction liquid, water may be used. A nonaqueous solvent may be used in consideration of solubility of the monomer. For example, alcohols may be used as the nonaqueous solvent. Examples of the dispersing medium or solvent for the conductive polymer include water and these nonaqueous solvents.

Examples of the dopant include a sulfate ion, a nitrate ion, a phosphate ion, a borate ion, a benzenesulfonate ion, a naphthalenesulfonate ion, a toluenesulfonate ion, a methanesulfonate ion ($CF_3SO_3-$), a perchlorate ion ($ClO_4-$), a tetrafluoroborate ion ($BF_4$), a hexafluorophosphate ion ($PF_6-$), a fluorosulfate ion ($FSO_3-$), a bis(fluorosulfonyl) imide ion ($N(FSO_2)_2-$), and a bis(trifluoromethanesulfonyl) imide ion ($N(CF_3SO_2)_2-$). These dopants may be used alone or in combination of two or more of these dopants.

The dopant may be a polymer ion. Examples of the polymer ion include ions of polyvinylsulfonic acid, polystyrenesulfonic acid, polyallylsulfonic acid, polyacrylsulfonic acid, polymethacrylsulfonic acid, poly(2-acrylamide-2-methylpropanesulfonic acid), polyisoprenesulfonic acid, and polyacrylic acid. These dopants may be a homopolymer or a copolymer of two or more monomers. These dopants may be used alone or in combination of two or more of these dopants.

According to the present exemplary embodiment, an IR spectrum of active layer 113 exhibits a peak derived from a carbonyl group. Such active layer 113 can be formed by introducing a carbonyl group into the conductive polymer layer. The carbonyl group can be introduced by, for example, bringing a carbonyl group-containing compound into contact with the conductive polymer layer formed on positive current collector 111. The carbonyl group-containing compound is brought into contact with the conductive polymer layer, thereby depositing (or introducing) the carbonyl group-containing compound or a residue of the compound on (or into) the conductive polymer. Thus a peak derived from the carbonyl group comes to be observed in an IR spectrum for the active layer.

In the IR spectrum of the active layer, it is enough that the peak derived from the carbonyl group is observed, and the position of the peak derived from the carbonyl group in the IR spectrum is not particularly limited. In the IR spectrum of the active layer, however, the peak derived from the carbonyl group preferably appears at least in a range from 1600 $cm^{-1}$ to 1700 $cm^{-1}$, inclusive. When the IR spectrum of the active layer shows a peak in this range, the float property is more easily maintained. Further, the peak derived from the carbonyl group may be observed, in addition to in the range from 1600 $cm^{-1}$ to 1700 $cm^{-1}$, inclusive, in a range other than the foregoing range. The IR spectrum of the active layer preferably exhibits, as the peak derived from the carbonyl group, at least a peak derived from an amide-linked carbonyl group. In this case, the float property is further easily maintained.

The introduction form of the carbonyl group in the conductive polymer is not particularly limited. The carbonyl group may be directly or indirectly bonded to the conductive polymer. For example, the carbonyl group may be bonded to an end of a conductive polymer chain. Alternatively, the carbonyl group may be introduced into the active layer by intermolecular interaction. The carbonyl group may be introduced into the active layer, for example, with the carbonyl group bonded to or interacting with a nitrogen atom contained in a polyaniline. Alternatively, the carbonyl group may be bonded to a monomer or an oligomer for the conductive polymer contained in the active layer.

Examples of the carbonyl group-containing compound include carboxylic acids, carboxylic acid esters, lactones, aldehydes, ketones, amides, lactams, succinic acids, glutaric acids, adipic acids, suberic acids, sebacic acids, and decenoic acids. The carbonyl group-containing compounds may be used alone or in combination of two or more amine compounds.

It is enough that the carbonyl group-containing compound is brought into contact with the conductive polymer layer. For example, the conductive polymer layer may be treated with the use of the carbonyl group-containing compound and/or a solution containing the carbonyl group-containing compound. Alternatively, the carbonyl group-containing compound may be used in carrying out a reductive treatment for dedoping from a dopant with which the conductive polymer is doped. The carbonyl group-containing compound may be used as a solution containing the carbonyl group-containing compound. In addition, in washing the conductive polymer layer, the layer may be washed with the use of a solution containing the carbonyl group-containing compound. It is advantageous to use the carbonyl group-containing compound having a reduction action in carrying out a reductive treatment, because the reductive treatment and the introduction of the carbonyl group into the conductive polymer layer can be carried out at the same timing.

When the conductive polymer layer is a porous body, it is preferable to impregnate pores of the porous body with the carbonyl group-containing compound (or a solution containing the carbonyl group-containing compound).

Examples of the carbonyl group-containing compound having reduction action include aldehydes, formic acid, oxalic acid, gallic acid, and ascorbic acids (ascorbic acid, isoascorbic acid, or salts of the acids). Such compounds, with moderate reduction action, can be used as a reductant in the reduction of the conductive polymer layer, and are capable of introducing carbonyl groups into the conductive polymer layer. Thus, the compounds are advantageous for securing a high float property. Formaldehyde and glyoxal, as well as aliphatic aldehydes, alicyclic aldehydes, and aromatic aldenydes may be all used as the aldehydes. Among the aldehydes, from the standpoint of highly reducing property, formaldehyde and glyoxal are preferred, and aliphatic aldehydes such as acetaldehyde, propionaldehyde, and butylaldehyde are also preferred. The reductants may be used alone or in combination of two or more valve metals.

The solution containing the carbonyl group-containing compound contains, for example, the carbonyl group-containing compound and a solvent that dissolves the compound. Examples of the solvent include water and organic solvents such as alcohols.

In addition, by using the carbonyl group-containing compound with a large number of carboxylic acids, the strength of the active layer can be improved. Specifically, one conductive polymer is bonded to the carbonyl group-containing compound including one carboxylic acid, whereas conductive polymers are bonded to each carboxylic acid of the carbonyl group-containing compound with a number of carboxylic acids, thus making the active layer bonded strongly.

In addition, the carbonyl group-containing compound that has a branched structure and has a long distance between the carboxylic acids forms a two-dimensional or three-dimensional network structure in carboxylic acid. Thus, the strength of the active layer using such a carbonyl group-containing compound is further increased, which is preferred.

Examples of such a carbonyl group-containing compound include alkyl dicarboxylic acids, alkyl tricarboxylic acids, aryl tricarboxylic acids, and aryl tetrarcarboxylic acids.

Examples of the alkyl dicarboxylic acids include 2-butylsuccinic acid, 2,3-dimethylglutaric acid, 2,3-diethylglutaric acid, 2,3-dipropylglutaric acid, 2-butyl-3-methylglutaric acid, 2,2,4,4-tetraethylglutaric acid, 3,3,5-trimethyladipic acid, 2,7-dibutylsuberic acid, 2,9-dipropylsebacic acid, 12-vinyl-8-octadecanedioic acid, and 7,12--dimethyl-7,11-octadecadiene-1,18-dicarboxylic acid.

Examples of the alkyl tricarboxylic acids include 1,2,4-butane tricarboxylic acid, 1,2,5-hexane tricarboxylic acid, 1,2,4-cyclohexane tricarboxylic acid, and 1,2,7,8-octane tetracarboxylic acid.

Examples of the aryl tricarboxylic acids include 1,2,4-benzene tricarboxylic acid (trimellitic acid), 1,2,5-benzene tricarboxylic acid, 2,5,7-naphthalene tricarboxylic acid, and 1,2,4-naphthalene tricarboxylic acid.

Examples of the aryl tetracarboxylic acids include pyromellitic acid.

It is to be noted that the thickness of active layer 113 can be easily controlled by, for example, appropriately changing the current density or the polymerization time for electrolysis, or adjusting the amount of the conductive polymer deposited on the positive current collector. The thickness of active layer 113 ranges, for example, from 10 μm to 300 μm, inclusive, per surface of the electrochemical device. In addition, in active layer 113, the dopant may be all or partially subjected to dedoping through a reductive treatment.

(Negative Electrode)

Negative electrode 12 includes, for example, a negative current collector and a negative electrode material layer.

For the negative current collector, for example, a sheet-form metallic material is used. The sheet-form metallic material is, for example, a metal foil piece, a metal porous body, a punched metal, an expanded metal or an etched metal. As a material for the negative current collector, for example, copper, a copper alloy, nickel, or stainless steel can be used.

The negative electrode material layer preferably contains, as a negative electrode active material, a material that electrochemically occludes and releases lithium ions. Examples of such a material include a carbon material, a metal compound, an alloy, and a ceramic material. As the carbon material, graphite, hardly-graphitizable carbon (hard carbon), and easily-graphitizable carbon (soft carbon) are preferable. Graphite and hard carbon are particularly preferable. Examples of the metal compound include silicon oxides and tin oxides. Examples of the alloy include silicon alloys and tin alloys. Examples of the ceramic material include lithium titanate and lithium manganate. These materials may be used alone or in combination of two or more of these dop ants. Among these materials, the carbon material is preferable since this material can lower negative electrode 12 in potential.

The negative electrode material layer preferably contains, in addition to the negative electrode active material, a conductive agent, a binder and others. Examples of the conductive agent include carbon black and a carbon fiber. Examples of the binder include a fluororesin, an acrylic resin, a rubber material, and a cellulose derivative. Examples of the fluororesin include polyvinylidene fluoride, polytetrafluoroethylene, and a tetrafluoroethylene-hexafluoropropylene copolymer. Examples of the acrylic resin include polyacrylic acid and an acrylic acid-methacrylic acid copolymer. Examples of the rubber material include styrene-butadiene rubber, and examples of the cellulose derivative include carboxymethyl cellulose or salts of the carboxymethyl cellulose.

The negative electrode material layer is formed, for example, by preparing a negative electrode mixture paste that contains a mixture of a negative electrode active material, a conductive agent, a binder and others with a dispersion medium, applying the negative electrode mixture paste to the negative current collector, followed by drying.

Negative electrode 12 is preferably pre-doped with lithium ions in advance. Thus, a potential of negative electrode 12 is lowered so that a difference in potential (that is, voltage) between positive electrode 11 and negative electrode 12 increases. Consequently, energy density of electrochemical device 100 is improved.

The pre-doping of negative electrode 12 with lithium ions is advanced, for example, as follows. A metal lithium film that serves as a supply source of the lithium ions is formed on a surface of the negative electrode material layer. And then impregnating negative electrode 12 having the metal lithium film is impregnated with an electrolytic solution (for example, a nonaqueous electrolytic solution) having lithium ion conductivity. At this time, lithium ions are eluted from the metal lithium film into the nonaqueous electrolytic solution, and the eluted lithium ions are occluded in the negative electrode active material. For example, when graphite or hard carbon is used as the negative electrode active material, lithium ions are inserted into between layers of graphite or into fine pores of hard carbon. An amount of the lithium ions, with which the negative electrode is to be pre-doped, can be controlled by a mass of the metal lithium film.

The step of pre-doping negative electrode 12 with lithium ions may be performed before electrode group 10 is assembled, or the pre-doping may be advanced after electrode group 10 is housed, together with the nonaqueous electrolytic solution, in case 101 for electrochemical device 100.

(Separator)

As separator 13, for example, the following is preferably used: a nonwoven fabric made of cellulose fiber, a nonwoven fabric made of glass fiber, a microporous membrane made of polyolefin, a fabric cloth, or a nonwoven fabric. Separator 13 has, for example, a thickness ranging from 10 µm to 300 µm, inclusive, and preferably from 10 µm to 40 µm, inclusive.

(Nonaqueous Electrolytic Solution)

Electrode group 10 preferably includes a nonaqueous electrolytic solution.

The nonaqueous electrolytic solution has lithium ion conductivity, and contains a lithium salt and a nonaqueous solvent in which the lithium salt is dissolved. At this time, doping and dedoping of anions of the lithium salt with respect to positive electrode 11 can be reversibly repeated. Meanwhile, reversibly, lithium ions derived from the lithium salt are occluded into negative electrode 12, and released from negative electrode 12.

Examples of the lithium salt include $LiClO_4$, $LiBF_4$, $LiPF_6$, $LiAlCl_4$, $LiSbF_6$, $LiSCN$, $LiCF_3SO_3$, $LiFSO_3$, $LiCF_3CO_2$, $LiAsF_6$, $LiB_{10}Cl_{10}$, LiCl, LiBr, LiI, $LiBCl_4$, $LiN(FSO_2)_2$, and $LiN(CF_3SO_2)_2$. These lithium salts may be used alone or in combination of two or more of these lithium salts. Among these lithium salts, at least one selected from the group consisting of lithium salts having an oxo acid anion containing a halogen atom suitable for an anion, and lithium salts having an imide anion is preferably used. A concentration of the lithium salt in the nonaqueous electrolytic solution in the charged state (state-of-charge (SOC): 90% to 100%) ranges, for example, from 0.2 mol/L to 5 mol/L, inclusive.

As the nonaqueous solvent, cyclic carbonates such as ethylene carbonate, propylene carbonate, and butylene carbonate; chain carbonates such as dimethyl carbonate, diethyl carbonate, and ethyl methyl carbonate; aliphatic carboxylates such as methyl acetate, methyl propionate, and ethyl propionate; lactones such as γ-butyrolactone and γ-valerolactone; chain ethers such as 1,2-dimethoxyethane (DME), 1,2-diethoxyethane (DEE) and ethoxymethoxyethane (EME); cyclic ethers such as tetrahydrofuran and 2-methyltetrahydrofuran; and dimethylsulfoxide, 1,3-dioxolane, formamide, acetamide, dimethylformamide, dioxolane, acetonitrile, propionitrile, nitromethane, ethylmonoglyme, trimethoxymethane, sulfolane, methyl sulfolane, and 1,3-propanesultone can be used. These solvents may be used alone, or may be used in combination of two or more of these solvents.

In the nonaqueous electrolytic solution, an additive may be added to the nonaqueous solvent as required. For example, an unsaturated carbonate such as vinylene carbonate, vinyl ethylene carbonate or divinyl ethylene carbonate may be added as an additive for forming a film high in lithium ion conductivity on the surface of negative electrode surface 12.

(Production Method)

Hereinafter, one example of a method for producing electrochemical device 100 of the present invention will be described with reference to FIGS. 2 and 3. However, the method for producing electrochemical device 100 of the present invention is not limited to this example.

Electrochemical device 100 is produced by, for example, a method including the following steps. Carbon layer 112 is formed on positive current collector 111. Active layer 113 including a conductive polymer is formed on positive current collector 111 with carbon layer 112 interposed therebetween to yield positive electrode 11. Yielded positive electrode 11, separator 13, and negative electrode 12 are laminated in this order to yield electrode group 10. And yielded electrode group 10 is housed together with a nonaqueous electrolytic solution into container 101.

Carbon layer 112 is formed with the use of, for example, a carbon paste as described above.

As described above, active layer 113 is formed, for example, by forming a conductive polymer layer and introducing a carbonyl group into the conductive polymer layer in the presence of positive current collector 111 with carbon layer 112.

To positive electrode 11 yielded as described above is connected a lead member (lead tab 105A having lead wire 104A). To negative electrode 12 is connected another lead member (lead tab 105B having lead wire 104B). Subsequently, separator 13 is interposed between positive electrode 11 and negative electrode 12, to which these lead members are respectively connected, and then the resulting workpiece is wound to yield electrode group 10 as illustrated in FIG. 3, which has one end surface from which the lead members are exposed. An outermost periphery of electrode group 10 is fixed with fastening tape 14.

Next, as illustrated in FIG. 2, electrode group 10 is housed, together with a nonaqueous electrolytic solution (not illustrated), in bottomed cylindrical container 101 having an opening. Lead wires 104A and 104B are led out from sealing body 102. Sealing body 102 is disposed in the opening in container 101 to seal container 101. Specifically, container 101 is, at its part near an end of the opening, processed inward by drawing, and the opening end is curled to swage sealing body 102. Sealing body 102 is formed of, for example, an elastic material containing a rubber component.

In the above-mentioned exemplary embodiment, a wound-type electrochemical device having a cylindrical shape has been described. However, the application scope of the present invention is not limited to this wound-type electrochemical device. Thus, the present invention can also be applied to a rectangular wound-type or a stacked-type electrochemical device.

EXAMPLES

Hereinafter, the present invention will be described in more detail with reference to Examples. The present invention, however, is not limited to Examples.

(Example 1)

(1) Preparation of positive electrode

A laminate was prepared in which a carbon layer (thickness: 2 µm) containing carbon black was formed onto each surface of an aluminum foil piece with a thickness of 30 µm. Meanwhile, an aqueous aniline solution containing aniline and sulfuric acid was prepared.

The laminate and a counter electrode were immersed in the aqueous aniline solution, and subjected to electrolytic polymerization at a current density of 10 mA/cm² for 20 minutes to deposit a film of a conductive polymer (polyaniline) doped with sulfate ions ($SO_4^{2-}$) onto the carbon layer of each of the surfaces of the laminate.

The conductive polymer doped with the sulfate ions was reduced for dedoping from the sulfate ions used for the doping. The reduction was carried out by immersing the laminate with the conductive polymer films formed in an aqueous solution containing an oxalic acid as a reductant at a concentration of 0.1 mol/L. In this way, an active layer containing the conductive polymer was formed. Next, the active layer was sufficiently washed, and then dried. The active layer had a thickness of 35 μm per surface of the laminate.

Figure 4:
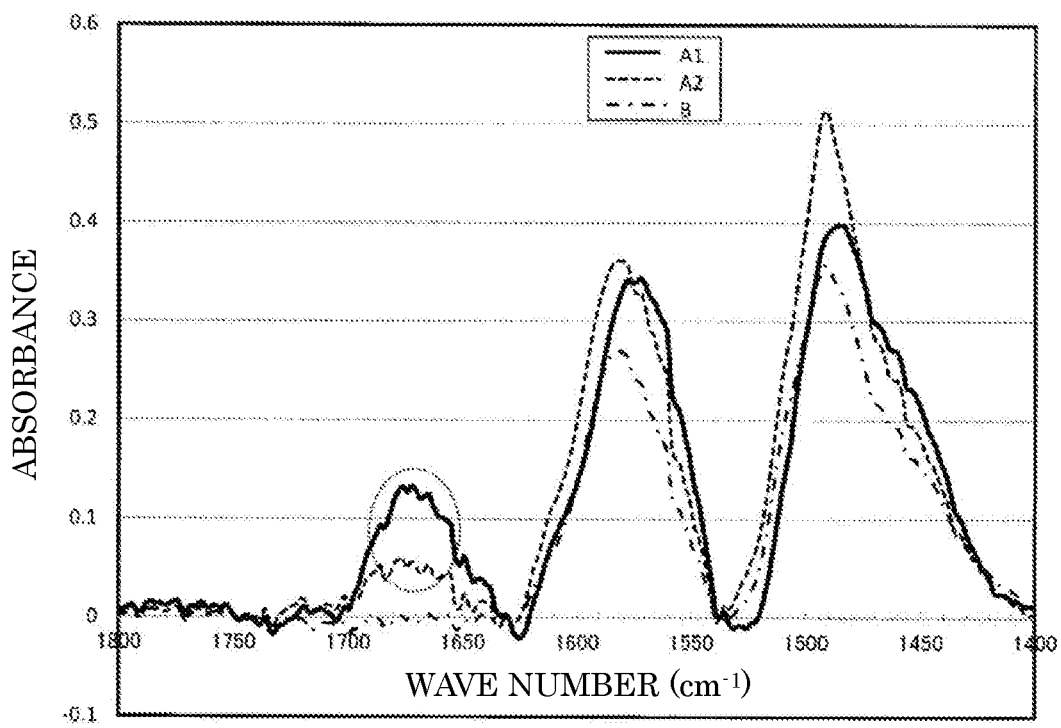
FIG. 4 is an IR spectrum for an active layer of a positive electrode according to Example 1.

For the active layer of the obtained positive electrode, an IR spectrum was measured with the use of an FT-IR measuring apparatus. The IR spectrum in this case is shown in FIG. 4. As shown in FIG. 4, in the IR spectrum for the active layer, a peak derived from the stretching vibration of the carbonyl group was observed around 1670 $cm^{-1}$.

(2) Fabrication of Negative Electrode

A copper foil piece having a thickness of 20 μm was prepared as a negative current collector. Meanwhile, mixed powder containing 97 parts by mass of hard carbon, 1 part by mass of carboxycellulose, and 2 parts by mass of styrene butadiene rubber was kneaded and mixed with water at a ratio by mass of 40:60 (mixed powder:water) to prepare a negative electrode mixture paste. The negative electrode mixture paste was applied to both surfaces of the negative current collector, and dried to yield a negative electrode having negative electrode material layers. The negative electrode material layers each have a thickness of 35 μm, and disposed, respectively, on both surfaces of this electrode. Next, a metal lithium layer was formed on the negative electrode material layer so that an amount of this metal lithium layer is calculated to adjust the negative electrode potential in the electrolytic solution after completion of the pre-doping to less than or equal to 0.2 V relative to that of metal lithium.

(3) Preparation of Electrode Group

A lead tab was connected to each of the positive electrode and the negative electrode. Thereafter, as illustrated in FIG. 3, separators each made of a cellulose nonwoven fabric (thickness of 35 μm) were laminated alternately onto the positive electrode and the negative electrode. The resultant laminate was wound to form an electrode group.

(4) Preparation of Nonaqueous Electrolytic Solution

To a mixture of propylene carbonate and dimethyl carbonate at a volume ratio of 1:1, 0.2% by mass of vinylene carbonate was added to prepare a solvent. $LiPF_6$ as a lithium salt was dissolved in the resulting solvent at a predetermined concentration to prepare a nonaqueous electrolytic solution containing hexafluorophosphate ions ($PF_6$) as anions.

(5) Preparation of Electrochemical Device

The electrode group and the nonaqueous electrolytic solution were housed in a bottomed case having an opening to assemble an electrochemical device as illustrated in FIG. 2. Thereafter, the electrochemical device was aged at 25° C. for 24 hours while a charging voltage of 3.8 V was applied to between terminals of the positive electrode and the negative electrode, so as to advance pre-doping of the negative electrode with lithium ions. The resulting electrochemical device was evaluated in accordance with methods described below. Table 1 shows the evaluation results collectively.

(Evaluation Methods)
(1) Float Property
(1a) Internal Resistance Change Rate (ΔDCR)

A voltage of 3.8 V was applied to the electrochemical device to charge the electrochemical device, and then the electrochemical device was discharged for a predetermined period. From the amount of a drop of the voltage at this time, an initial internal resistance (initial DCR) of the device was obtained.

The internal resistance value was measured after the electrochemical device was continuously charged (float charging) for a predetermined period of time under the condition of 3.6 V at 60° C. And then a rate ΔDCR (%) of the internal resistance to the initial DCR was calculated in the case of regarding the initial DCR as 100%. As the value of ΔDCR is smaller, it is indicated that the decline in float property is suppressed.

(1b) Capacitance change rate ΔC

The discharged capacitance (initial capacitance) was measured when the electrochemical device was charged at a voltage of 3.8 V, and then discharged down to 2.5 V.

The discharged capacitance was measured in the same way as mentioned above after the electrochemical device was continuously charged (float charging) for a predetermined period of time under the condition of 3.6 V at 60° C. And then a rate ΔC (%) of the discharged capacitance to the initial capacitance was calculated in the case of regarding the initial capacitance as 100%. As the ΔC is closer to 100%, it is indicated that decrease in capacitance in the case of float charging is smaller, and reliability of the electrochemical device is higher.

(2) Withstand voltage characteristics

The positive electrode of 20 mm×20 mm for evaluation and a metal lithium foil piece as the other electrode were prepared. And then voltages were applied between the electrodes for every 50 mV from the standard electrode potential in a nonaqueous electrolytic solution, and the reaction current was measured after the retention for 1 hour. Then, the reaction current density was determined from the reaction current and the mass of the active material.

(Example 2)

In the same way as in Example 1 except that the oxalic acid was changed to a formic as the reductant, an electrochemical device was prepared and evaluated for float property and reliability.

For the obtained active layer, when an IR spectrum was measured with the use of an FT-IR measuring apparatus, a peak derived from the stretching vibration of the carbonyl group was, as shown in FIG. 4, observed around 1670 $cm^{-1}$, which is surrounded by a dotted ellipse in FIG. 4.

(Comparative Example 1)

In the same way as in Example 1 except for electrochemical reduction in an aqueous solution of sulfuric acid instead of the reduction with the oxalic acid, an electrochemical device was prepared and evaluated.

For the obtained active layer, when an IR spectrum was measured with the use of an FT-IR measuring apparatus, a peak derived from a carbonyl group was not observed as shown in FIG. 4.

Figure 5:
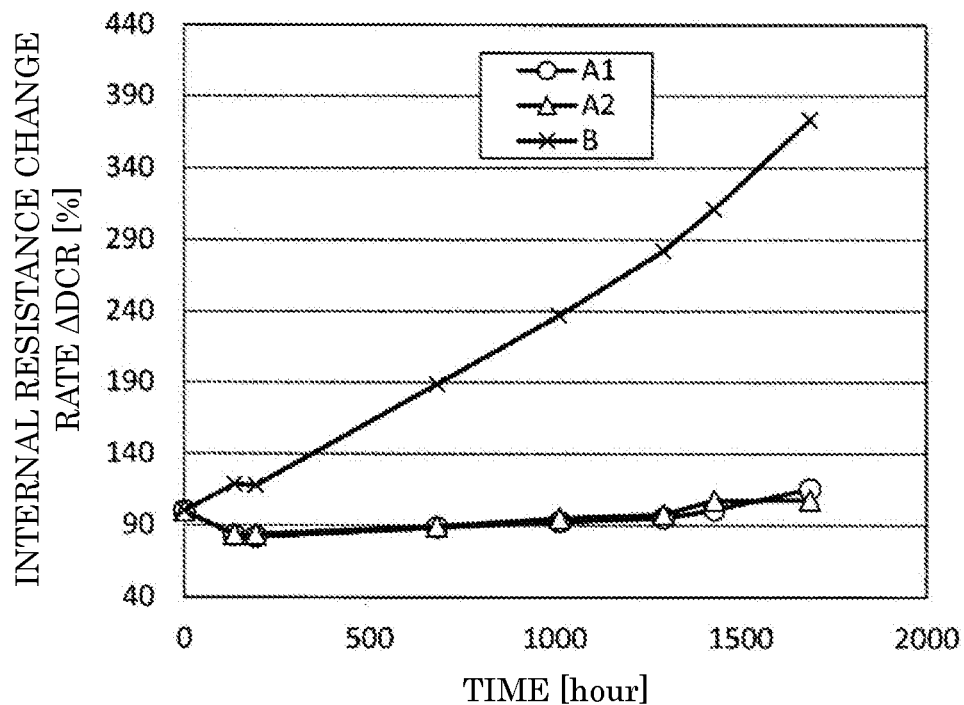
FIG. 5 is a graph showing evaluation results for float properties (internal resistance change $\Delta$DCR in the case of float charging) of electrochemical devices according to Examples 1 to 2 and Comparative Example 1.

FIG. 5 shows evaluation results for the float property in Examples 1 to 2 and Comparative Example 1. Further, FIG. 6 and FIG. 7 respectively show evaluation results for capacitance change rate and evaluation results for withstand voltage characteristics. It is to be noted that in these figures, Examples 1 to 2 are represented by A1 to A2, whereas Comparative Example 1 is represented by B.

As shown in FIG. 5, the internal resistance change rate ADCR in float charging in the examples, where the active layer exhibits the peak derived from the carbonyl group, is lower as compared with that in the comparative example, where such a peak is not shown.

Figure 6:
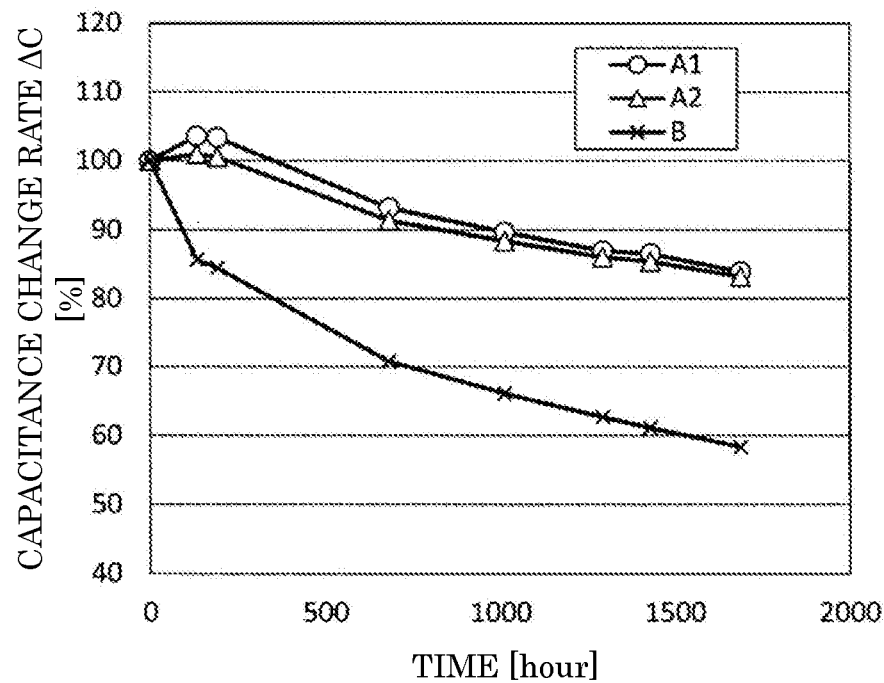
FIG. 6 is a graph showing evaluation results for reliability (capacitance change rate $\Delta$C in the case of float charging) of electrochemical devices according to Examples 1 to 2 and Comparative Example 1.

In addition, as shown in FIG. 6, the capacitance change AC in float charging in the examples is lower as compared with that of the comparative example.

In other words, it is determined that the decrease in float property is suppressed to enhance the reliability of the electrochemical devices in the examples, as compared with the comparative example.

Figure 7:
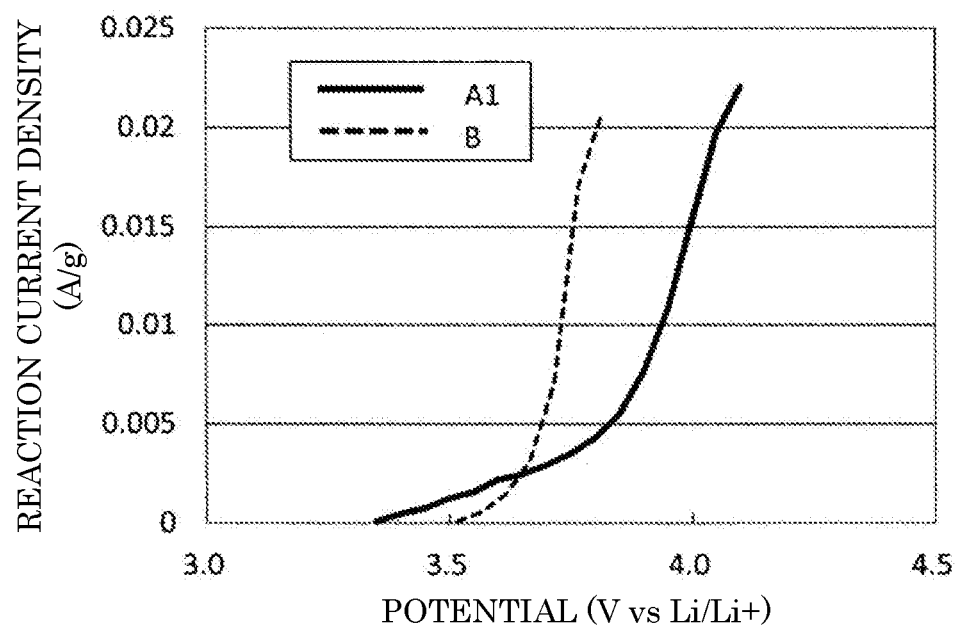
FIG. 7 is a graph showing evaluation results for withstand voltage characteristics (reaction current density) of electrochemical devices according to Example 1 and Comparative Example 1.

As shown in FIG. 7, it is determined that, for example, the potential at the reaction current density of 0.01 A/g is 3.7 V in Comparative Example 1, whereas the potential at the reaction current density of 0.01 A/g is improved to be 3.9 V in Example 1. In other words, it is determined that, at the reaction current density of 0.01 A/g, the potential at which a leakage current is generated is improved from 3.7 V to 3.9 V. This means that the withstand voltage characteristics is also improved.

Further, the electrochemical devices according to Examples 1 and 2 were disassembled to extract the positive electrodes. And then the positive electrodes were sufficiently washed, and IR spectra for the active layers were measured in the way as mentioned above. As a result, peaks derived from the stretching vibrations of the carbonyl groups were observed around 1670 $cm^{-1}$, as with the measurement results for the active layers of the positive electrodes before assembling the electrochemical devices.

INDUSTRIAL APPLICABILITY

The electrochemical device according to the present invention is excellent in float property, and thus suitable as various electrochemical devices, in particular, power supplies for backup.

REFERENCE MARKS IN THE DRAWINGS

10: electrode group
11: positive electrode
111: positive current collector
112: carbon layer
113: active layer
12: negative electrode
13: separator
14: fastening tape
100: electrochemical device
101: container
102: sealing body
103: base plate
104A, 104B: lead wire
105A, 105B: lead tab

The invention claimed is:

1. A positive electrode for an electrochemical device, the positive electrode comprising:
   a positive current collector, and
   an active layer including a conductive polymer disposed on the positive current collector, wherein:
   the conductive polymer contains a polyaniline or a derivative of polyaniline,
   an infrared absorption spectrum of the active layer exhibits a peak derived from an amide-linked carbonyl group, and
   the peak derived from the amide-linked carbonyl group appears at least in a range from 1600 $cm^{-1}$ to 1700 $cm^{-1}$, inclusive.

2. The positive electrode according to claim 1, wherein the active layer includes a carbonyl group-containing compound or a residue of the carbonyl group-containing compound, the carbonyl group-containing compound having reduction action.

3. The positive electrode according to claim 2, wherein the carbonyl group-containing compound is at least one selected from the group consisting of aldehydes, formic acid, oxalic acid, gallic acid, and ascorbic acids.

4. The positive electrode according to claim 2, wherein the carbonyl group-containing compound includes a plurality of carboxylic acids.

5. An electrochemical device comprising:
   the positive electrode according to claim 1, and
   a negative electrode.

* * * * *